United States Patent
Duke et al.

(10) Patent No.: US 10,755,282 B1
(45) Date of Patent: *Aug. 25, 2020

(54) PAYMENT VEHICLE WITH ON AND OFF FUNCTIONS

(71) Applicant: Wells Fargo Bank, N.A., San Francisco, CA (US)

(72) Inventors: Michael T. Duke, Monroe, NC (US); Dean Patrick Nolan, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/792,581

(22) Filed: Oct. 24, 2017

Related U.S. Application Data

(60) Continuation of application No. 13/826,246, filed on Mar. 14, 2013, now Pat. No. 10,410,217, which is a division of application No. 12/316,996, filed on Dec. 18, 2008, now abandoned.

(60) Provisional application No. 61/197,872, filed on Oct. 31, 2008.

(51) Int. Cl.
 *G06Q 20/42* (2012.01)
(52) U.S. Cl.
 CPC .................... *G06Q 20/42* (2013.01)
(58) Field of Classification Search
 CPC ......... G06Q 20/00; G06Q 20/42; G06Q 40/00
 USPC ......................................................... 705/41
 See application file for complete search history.

(56) References Cited

U.S. PATENT DOCUMENTS

| | | |
|---|---|---|
| 5,485,510 A | 1/1996 | Colbert |
| 5,737,423 A | 4/1998 | Manduley |
| 6,105,006 A | 8/2000 | Davis et al. |
| 6,188,309 B1 | 2/2001 | Levine |
| 6,193,152 B1 | 2/2001 | Fernando et al. |
| 6,422,462 B1 | 7/2002 | Cohen |
| 6,494,367 B1 | 12/2002 | Zacharias |
| 6,575,361 B1 | 6/2003 | Graves et al. |
| 6,717,592 B2 | 4/2004 | Gusler et al. |

(Continued)

FOREIGN PATENT DOCUMENTS

| | | |
|---|---|---|
| GB | 2 441 156 | 2/2008 |
| WO | WO-90/13096 A1 | 11/1990 |

(Continued)

OTHER PUBLICATIONS

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

(Continued)

*Primary Examiner* — Robert R Niquette
*Assistant Examiner* — Liz P Nguyen
(74) *Attorney, Agent, or Firm* — Foley & Lardner & LLP

(57) ABSTRACT

A computer-based network system and method for using a payment vehicle having an on and off function. The system comprises a payment vehicle comprising an on and off function to enable or to disable the payment vehicle in the computer-based network for processing an electronic payment transaction, a holder of the payment vehicle, and a computer payment network wherein the computer payment network comprises a transaction engine for enabling or for disabling the payment vehicle at a request of the holder of the payment vehicle.

20 Claims, 8 Drawing Sheets

(56) References Cited

U.S. PATENT DOCUMENTS

| | | |
|---|---|---|
| 6,845,906 B2 | 1/2005 | Royer et al. |
| 6,865,547 B1 | 3/2005 | Brake et al. |
| 6,879,965 B2 | 4/2005 | Fung et al. |
| 6,980,969 B1 | 12/2005 | Tuchler et al. |
| 7,014,107 B2 | 3/2006 | Singer et al. |
| 7,016,877 B1 | 3/2006 | Steele et al. |
| 7,219,833 B2 | 5/2007 | Cantini et al. |
| 7,225,156 B2 | 5/2007 | Fisher et al. |
| 7,249,099 B2 | 7/2007 | Ling |
| 7,264,154 B2 | 9/2007 | Harris |
| 7,319,986 B2 | 1/2008 | Praisner et al. |
| 7,359,880 B2 | 4/2008 | Abel et al. |
| 7,383,988 B2 * | 6/2008 | Slonecker, Jr. ....... G06Q 20/354 235/380 |
| 7,392,224 B1 | 6/2008 | Bauer et al. |
| 7,398,248 B2 | 7/2008 | Phillips et al. |
| 7,451,395 B2 | 11/2008 | Brants et al. |
| 7,552,088 B2 | 6/2009 | Malcolm |
| 7,571,142 B1 | 8/2009 | Flitcroft et al. |
| 7,653,597 B1 | 1/2010 | Stevanovski et al. |
| 7,685,037 B2 | 3/2010 | Reiners et al. |
| 7,689,502 B2 | 3/2010 | Lilly et al. |
| 7,698,221 B2 | 4/2010 | Blinn et al. |
| 7,712,655 B2 | 5/2010 | Wong |
| 7,753,265 B2 * | 7/2010 | Harris .................... G06Q 20/10 235/379 |
| 7,778,932 B2 | 8/2010 | Yan |
| 7,818,319 B2 | 10/2010 | Henkin et al. |
| 7,873,573 B2 | 1/2011 | Realini |
| 7,949,572 B2 | 5/2011 | Perrochon et al. |
| 7,954,704 B1 | 6/2011 | Gephart et al. |
| 8,245,909 B2 | 8/2012 | Pletz et al. |
| 8,249,983 B2 | 8/2012 | Dilip et al. |
| 8,255,323 B1 | 8/2012 | Casey et al. |
| 8,266,031 B2 | 9/2012 | Norris et al. |
| 8,266,205 B2 | 9/2012 | Hammad et al. |
| 8,297,502 B1 | 10/2012 | McGhie et al. |
| 8,301,566 B2 | 10/2012 | Mears |
| 8,359,531 B2 | 1/2013 | Grandison et al. |
| 8,396,808 B2 | 3/2013 | Greenspan |
| 8,407,136 B2 | 3/2013 | Bard et al. |
| 8,407,142 B1 | 3/2013 | Griggs |
| 8,423,349 B1 | 4/2013 | Huynh et al. |
| 8,489,894 B2 | 7/2013 | Comrie et al. |
| 8,543,506 B2 | 9/2013 | Grandcolas et al. |
| 8,589,335 B2 | 11/2013 | Smith et al. |
| 8,595,074 B2 | 11/2013 | Sharma et al. |
| 8,595,098 B2 | 11/2013 | Starai et al. |
| 8,635,687 B2 | 1/2014 | Binder |
| 8,682,753 B2 | 3/2014 | Kulathungam |
| 8,682,802 B1 | 3/2014 | Kannanari |
| 8,700,729 B2 | 4/2014 | Dua |
| 8,712,839 B2 | 4/2014 | Steinert et al. |
| 8,725,601 B2 | 5/2014 | Ledbetter et al. |
| 8,762,211 B2 | 6/2014 | Killian et al. |
| 8,762,237 B2 | 6/2014 | Monasterio et al. |
| 8,781,957 B2 | 7/2014 | Jackson et al. |
| 8,793,190 B2 | 7/2014 | Johns et al. |
| 8,794,972 B2 | 8/2014 | Lopucki |
| 8,851,369 B2 | 10/2014 | Bishop et al. |
| 8,887,997 B2 | 11/2014 | Barret et al. |
| 8,954,839 B2 | 2/2015 | Sharma et al. |
| 9,105,021 B2 | 8/2015 | Tobin |
| 9,195,984 B1 | 11/2015 | Spector et al. |
| 9,256,871 B2 | 2/2016 | Anderson et al. |
| 9,372,849 B2 | 6/2016 | Gluck et al. |
| 9,396,491 B2 | 7/2016 | Isaacson et al. |
| 9,519,934 B2 | 12/2016 | Calman et al. |
| 9,558,478 B2 | 1/2017 | Zhao |
| 9,646,300 B1 | 5/2017 | Zhou et al. |
| 9,647,855 B2 | 5/2017 | Deibert et al. |
| 10,402,818 B2 | 9/2019 | Zarakas et al. |
| 2001/0001856 A1 | 5/2001 | Gould et al. |
| 2001/0051920 A1 | 12/2001 | Joao et al. |
| 2002/0016749 A1 | 2/2002 | Borecki et al. |
| 2002/0035539 A1 | 3/2002 | O'Connell |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0216997 A1 | 11/2003 | Cohen |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0148259 A1 | 7/2004 | Reiners et al. |
| 2004/0178907 A1 | 9/2004 | Cordoba |
| 2004/0263901 A1 | 12/2004 | Critelli et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0199714 A1 | 9/2005 | Brandt et al. |
| 2005/0273431 A1 | 12/2005 | Abel et al. |
| 2006/0059110 A1 | 3/2006 | Madhok et al. |
| 2006/0202012 A1 | 9/2006 | Grano et al. |
| 2006/0235795 A1 | 10/2006 | Johnson et al. |
| 2007/0100773 A1 | 5/2007 | Wallach |
| 2007/0143831 A1 | 6/2007 | Pearson et al. |
| 2007/0203836 A1 | 8/2007 | Dodin |
| 2007/0255653 A1 | 11/2007 | Tumminaro et al. |
| 2007/0266257 A1 | 11/2007 | Camaisa et al. |
| 2008/0005037 A1 | 1/2008 | Hammad et al. |
| 2008/0017702 A1 | 1/2008 | Little et al. |
| 2008/0029608 A1 | 2/2008 | Kellum et al. |
| 2008/0052226 A1 | 2/2008 | Agarwal et al. |
| 2008/0115104 A1 | 5/2008 | Quinn |
| 2008/0154772 A1 | 6/2008 | Carlson |
| 2008/0191878 A1 | 8/2008 | Abraham |
| 2008/0244724 A1 | 10/2008 | Choe et al. |
| 2009/0005269 A1 | 1/2009 | Martin et al. |
| 2009/0055269 A1 | 2/2009 | Baron |
| 2009/0055642 A1 | 2/2009 | Myers et al. |
| 2009/0132351 A1 | 5/2009 | Gibson |
| 2009/0205014 A1 | 8/2009 | Doman et al. |
| 2009/0319638 A1 | 12/2009 | Faith et al. |
| 2010/0036769 A1 | 2/2010 | Winters et al. |
| 2010/0082487 A1 | 4/2010 | Nelsen |
| 2010/0312700 A1 | 12/2010 | Coulter et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0276479 A1 | 11/2011 | Thomas |
| 2012/0041881 A1 | 2/2012 | Basu et al. |
| 2012/0047072 A1 | 2/2012 | Larkin |
| 2012/0101938 A1 | 4/2012 | Kasower |
| 2012/0124658 A1 | 5/2012 | Brudnicki et al. |
| 2012/0227094 A1 | 9/2012 | Begen et al. |
| 2012/0254038 A1 | 10/2012 | Mullen |
| 2012/0259782 A1 | 10/2012 | Hammad |
| 2012/0296725 A1 | 11/2012 | Dessert et al. |
| 2013/0031006 A1 | 1/2013 | McCullagh et al. |
| 2013/0103391 A1 | 4/2013 | Millmore et al. |
| 2013/0117696 A1 | 5/2013 | Robertson et al. |
| 2013/0173402 A1 | 7/2013 | Young et al. |
| 2013/0218758 A1 | 8/2013 | Koenigsbrueck et al. |
| 2013/0226813 A1 | 8/2013 | Voltz |
| 2013/0346310 A1 | 12/2013 | Burger et al. |
| 2014/0040144 A1 | 2/2014 | Plomske et al. |
| 2014/0053069 A1 | 2/2014 | Yan |
| 2014/0067683 A1 | 3/2014 | Varadarajan |
| 2014/0108263 A1 | 4/2014 | Ortiz et al. |
| 2014/0114855 A1 | 4/2014 | Bajaj et al. |
| 2014/0123312 A1 | 5/2014 | Marcotte |
| 2014/0129357 A1 | 5/2014 | Goodwin |
| 2014/0149368 A1 | 5/2014 | Lee et al. |
| 2014/0200957 A1 | 7/2014 | Biggs |
| 2014/0237236 A1 | 8/2014 | Kalinichenko et al. |
| 2014/0258110 A1 | 9/2014 | Davis et al. |
| 2014/0279309 A1 | 9/2014 | Cowen et al. |

(56) References Cited

U.S. PATENT DOCUMENTS

| | | |
|---|---|---|
| 2014/0279474 A1 | 9/2014 | Evans et al. |
| 2014/0344153 A1 | 11/2014 | Raj et al. |
| 2014/0344877 A1 | 11/2014 | Ohmata et al. |
| 2014/0372308 A1 | 12/2014 | Sheets |
| 2015/0019944 A1 | 1/2015 | Kalgi |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0046338 A1 | 2/2015 | Laxminarayanan et al. |
| 2015/0100477 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0178724 A1 | 6/2015 | Ngo et al. |
| 2015/0180836 A1 | 6/2015 | Wong et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0213435 A1 | 7/2015 | Douglas et al. |
| 2015/0220999 A1 | 8/2015 | Thornton et al. |
| 2015/0221149 A1 | 8/2015 | Main et al. |
| 2015/0248405 A1 | 9/2015 | Rudich et al. |
| 2015/0254647 A1 | 9/2015 | Bondesen et al. |
| 2015/0254655 A1 | 9/2015 | Bondesen et al. |
| 2015/0286834 A1 | 10/2015 | Ohtani et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0339663 A1 | 11/2015 | Lopreiato et al. |
| 2015/0339664 A1 | 11/2015 | Wong et al. |
| 2015/0379508 A1 | 12/2015 | Van |
| 2016/0026997 A1 | 1/2016 | Tsui et al. |
| 2016/0028550 A1 | 1/2016 | Gaddam et al. |
| 2016/0042381 A1 | 2/2016 | Braine et al. |
| 2016/0063497 A1 | 3/2016 | Grant, IV |
| 2016/0078428 A1 | 3/2016 | Moser et al. |
| 2016/0092696 A1 | 3/2016 | Guglani et al. |
| 2016/0092870 A1 | 3/2016 | Salama et al. |
| 2016/0092874 A1 | 3/2016 | O'Regan et al. |
| 2016/0098692 A1 | 4/2016 | Johnson et al. |
| 2016/0119296 A1 | 4/2016 | Laxminarayanan et al. |
| 2016/0125409 A1 | 5/2016 | Meredith et al. |
| 2016/0140221 A1 | 5/2016 | Park et al. |
| 2016/0189121 A1 | 6/2016 | Best et al. |
| 2016/0294879 A1 | 10/2016 | Kirsch |
| 2016/0314458 A1 | 10/2016 | Douglas et al. |
| 2016/0321669 A1 | 11/2016 | Beck et al. |
| 2016/0358163 A1 | 12/2016 | Kumar et al. |
| 2016/0379211 A1 | 12/2016 | Hoyos et al. |
| 2017/0024393 A1 | 1/2017 | Choksi et al. |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0344991 A1 | 11/2017 | Mark et al. |
| 2018/0025145 A1 | 1/2018 | Morgner et al. |
| 2018/0053200 A1 | 2/2018 | Cronin et al. |

FOREIGN PATENT DOCUMENTS

| | | |
|---|---|---|
| WO | WO-2004/081893 | 9/2004 |
| WO | WO-2004/090825 | 10/2004 |
| WO | WO-2012/054148 | 4/2012 |

OTHER PUBLICATIONS

Microsoft, "Automatically summarize a document", 2016. 3 pages.

Austin Telco Federal Credit Union, "Lost or Stolen Cards", www.atfcu.org/lost-stolen-cards.htm; Apr. 9, 2004. 6 pages.

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

Fort Knox Federal Credit Union, "Lost or Stolen VISA Card", http://www.fortknoxfcu.org/loststolen.html, Feb. 1, 2001. 2 pages.

KONSKO: "Credit Card Tokenization: Here's What You Need to Know", Credit Card Basics, Credit Card—Advertisement Nerdwallet (Year: 2014).

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

RBC Royal Bank, "If Your Card is Lost or Stolen", http://www.rblbank.com/pdfs/CreditCard/FAQs.pdf, Oct. 1, 2002. 2 pages.

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Union Bank & Trust, "Report Lost or Stolen Card", http://www.ubt.com/security-fraud/report-lost-or-stolen-cards , Jul. 10, 2005. 13 pages.

\* cited by examiner

PAYMENT VEHICLE WITH ON AND OFF FUNCTIONS

CROSS-REFERENCE TO RELATED PATENT APPLICATIONS

This application is a continuation of and claims priority from U.S. patent application Ser. No. 13/826,246, filed on Mar. 14, 2013, which is a divisional of U.S. patent application Ser. No. 12/316,996, filed on Dec. 18, 2008, which claims priority from U.S. Provisional Application Ser. No. 61/197,872, filed on Oct. 31, 2008, the disclosures of which are incorporated herein by their entireties.

BACKGROUND

The present invention relates to a payment vehicle having an on and off function for use in a computer-based network for processing electronic payment transactions.

In today's payment environment, there are a very few number of payment transactions or other financial transactions that occur with cash. Most purchases occur with forms of payment other than cash using various payment instruments such as credit cards, debit cards, among others. Furthermore, there are an increasing number of payment transactions that occur electronically or via a web interface such as over the internet or worldwide web. With an increasing volume of transactions conducted with payment instruments other than cash and often not by the purchaser in person at point of sale, there is an increased likelihood of fraudulent transactions and lack of personal control over the payment transaction.

Additionally, in today's payment environment, a payment instrument is always turned "on" leading to abuse and fraud. Currently, a payment vehicle can be blocked if a credit or debit card, for example, is lost or stolen by calling a customer service representative of the card issuer after occurrence of the fraudulent event and requesting that the card be canceled or blocked after the occurrence. There are numerous disadvantages associated with such a process. For example, there may be a delay before a payment instrument holder even recognizes that a fraudulent event occurred or is occurring using the payment holder's payment instrument. There is also a real-time delay between when a payment instrument holder recognizes that there has been fraud or abuse associated with its payment instrument and when the customer service representative is able to cancel or block the account. Fraudulent use of a card can even occur while the customer service representative is canceling or blocking the account associated with the payment vehicle. Thus, a payment holder does not have direct control and is limited by currently existing processes. Likewise, a payment instrument holder who desires to make changes to its account does not have direct control to do so and also customarily relies upon a customer service representative.

With respect to misuse or fraudulent use of a payment instrument, there are ways in today's existing payment systems to minimize fraud and abuse of the payment vehicle; however, they require assistance outside of the control of the payment vehicle holder. For example, a credit or debit card account can be closed, a temporary block can be placed on the card, or a country level block can be placed (for example, do not accept any charges being made in a specified country). Unfortunately, such controls are implemented after occurrence of the event.

Thus, there is a need to minimize the current risk to a holder of a payment instrument. There is also a need to find a way to shift control of the payment instrument to the payment instrument holder as well as to mitigate abuse and fraud associated with unauthorized use of a payment vehicle and the delays associated with mitigating such loss. There is also a need to have greater control in the payment process.

As indicated above, most payment transactions today involve the transfer of electronic funds. For purposes of background, the current industry practice with respect to electronic funds payment using a payment instrument is best shown by referring now to FIG. 1 which is a flow diagram illustrating a known process for purchaser payment. According to FIG. 1, a purchaser typically carries multiple forms of payment to allow the purchaser to choose which source of funding to use to pay for a given purchase. As is the current practice in the industry, a line of communication must be made between each form of payment used by a purchaser and each source of funds via an existing computer payment network or system. This occurs for each transaction. Thus, each transaction may require a different form of payment, a different point of sale (POS) terminal, a different computer payment system, a different source of funds, or a combination thereof. Thus, for multiple transactions, there are numerous communications and many transaction processing steps that must occur.

FIG. 2A is a flow diagram which expands upon the existing computer payment system infrastructure of FIG. 1 and is an example of a credit or debit route for a VISA or MasterCard transaction. The parties to an authorization and a settlement VISA or MasterCard transaction typically comprise a purchaser, a merchant, an optional International Sales Organization (ISO), a merchant acquirer, VISA/MasterCard, an optional issuer processor, an issuer, and a source of funds. A series of events shown in FIG. 2A has to occur for each VISA/MasterCard transaction using a VISA/MasterCard payment card used at a merchant point of sale (POS) terminal. Among the disadvantages associated with such a system is that it requires purchasers to carry multiple payment instruments that are always "on," increases the risk that a payment instrument such as a credit card or a debit card will get lost or stolen which in turn increases the risk of fraud, and does not provide the payment instrument holder the ability to control the terms and conditions of the use of the payment instrument at point of sale.

FIG. 2B is a flow diagram illustrating the current industry process for authorization of a VISA/MasterCard transaction. FIG. 2C is a flow diagram illustrating the current industry process for settlement of a VISA/MasterCard transaction. In the authorization process, as shown in FIG. 2B, a purchaser uses a VISA/MasterCard payment card to pay for goods or services at a merchant point of sale (POS) terminal, the transaction is captured by an ISO or a merchant acquirer. An ISO is an independent sales organization that is a reseller of acquirer services. A merchant acquirer is typically a bank member of a card network that collects payments on behalf of a merchant. The transaction is then routed by the merchant acquirer to the computer payment network which, in this example, is VISA or MasterCard. The transaction is then routed to an issuer. The issuer is typically a bank member of a card network that issues network approved cards. The issuer may approve or deny a transaction based upon the presence of fraudulent activity or upon funds availability. The funds availability is communicatively connected to a source of funds as shown in FIG. 2A. The transaction is either approved or declined and returned to the merchant POS terminal.

With respect to the process for settlement shown m FIG. 2C, VISA/MasterCard facilitates settlement between the merchant acquirer and issuer. The merchant acquirer then settles with the merchant. The issuer then settles with the purchaser using the funding source that is linked to the VISA MasterCard payment card.

The above process is known and currently occurs for each such payment transaction. As indicated above, there is no means for a payment holder to have direct control over the payment instrument's availability for use because it is always "on." There is no means to address fraudulent use until after the occurrence of the fraud or misuse. Thus, there remains a need for an alternative payment instrument that addresses these enumerated concerns as well as others of the payment instrument holder.

SUMMARY OF THE INVENTION

The present invention is directed to a computer-based network system and method for using a payment vehicle having an on and off function. The system comprises a payment vehicle comprising an on and off function to enable or to disable the payment vehicle in the computer-based network for processing an electronic payment transaction. The system also comprises a holder of the payment vehicle and a computer payment network. The computer payment network preferably comprises a transaction engine for enabling or for disabling the payment vehicle at a request of the holder of the payment vehicle.

The present invention also provides for a method of using the payment vehicle having an on and off function. The method generally comprises receiving a message from a payment vehicle holder to enable a payment vehicle of the payment vehicle holder prior to a payment transaction and enabling the payment vehicle by removing a block placed on the payment vehicle. Alternatively, the method generally comprises receiving a message from a payment vehicle holder to disable a payment vehicle of the payment vehicle holder and disabling the payment vehicle by placing a block on the payment vehicle.

The method of using a payment vehicle having an on and off function also generally comprises receiving a request from a user to use a payment vehicle of a payment vehicle holder for an electronic payment transaction in a computer-based payment network prior to a payment transaction, checking to see if a block has been placed or removed by the payment vehicle holder on the payment vehicle, and terminating the electronic payment transaction if the block has been placed on the payment vehicle.

There are also numerous features and functions associated with the payment vehicle having an on and off function in accordance with the present invention. Many of which are described in detail herein. Further areas of applicability of the present invention will become apparent from the detailed description provided hereinafter. It should be understood that $_{th}^{-}$ detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION

Figure 1:
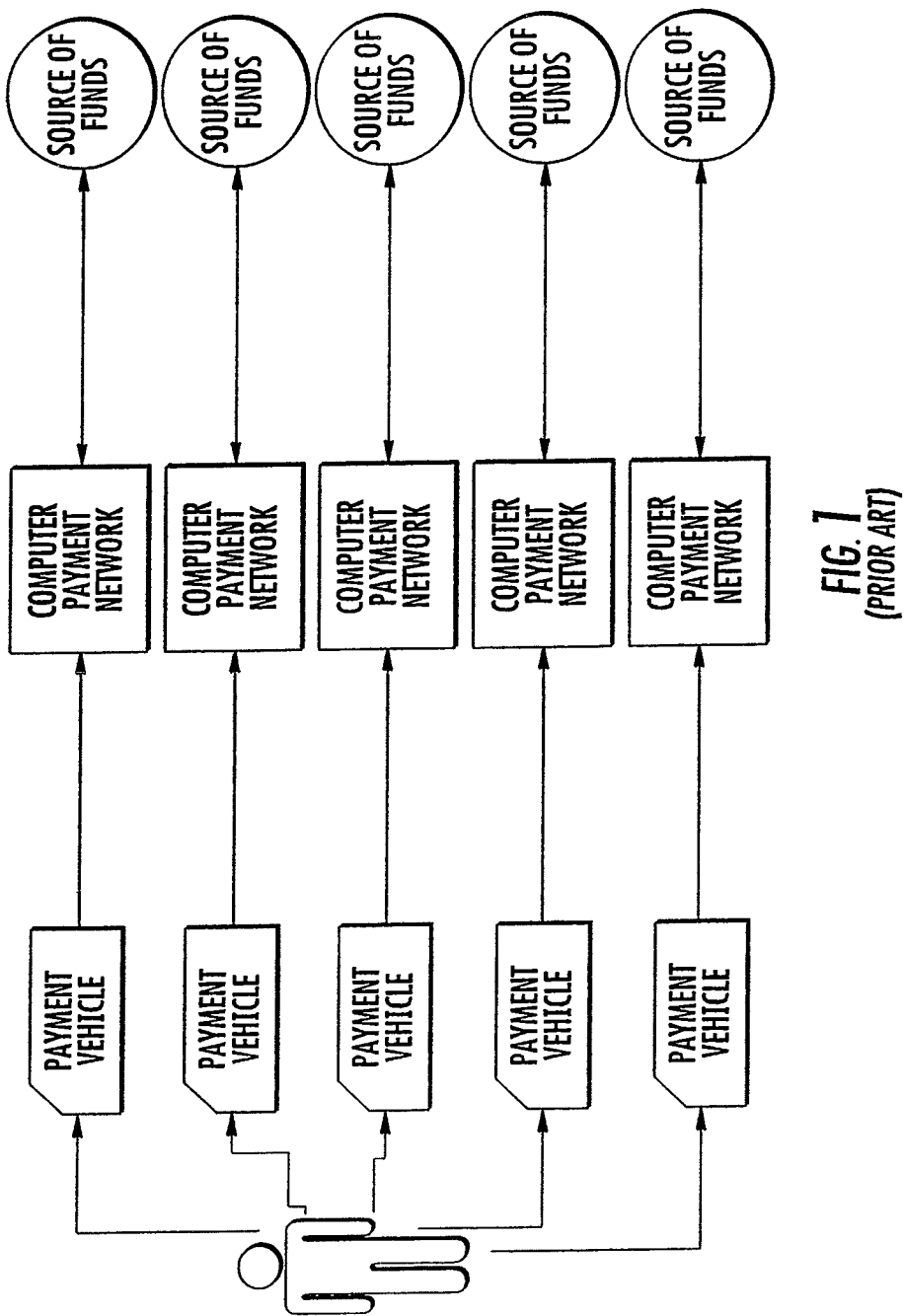
FIG. 1 is a flow diagram illustrating a known process for making purchaser payments with a traditional payment instrument and computer network payment system.
Figure 2A:
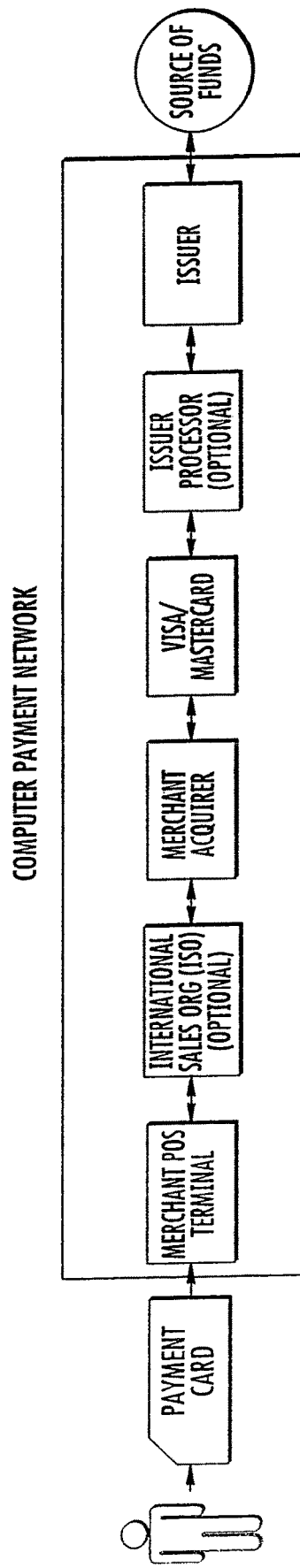
FIG. 2A is a flow diagram which expands upon the existing computer payment system infrastructure of FIG. 1 and is an example of a credit or debit route for a typical VISA or MasterCard transaction.
Figure 2B:
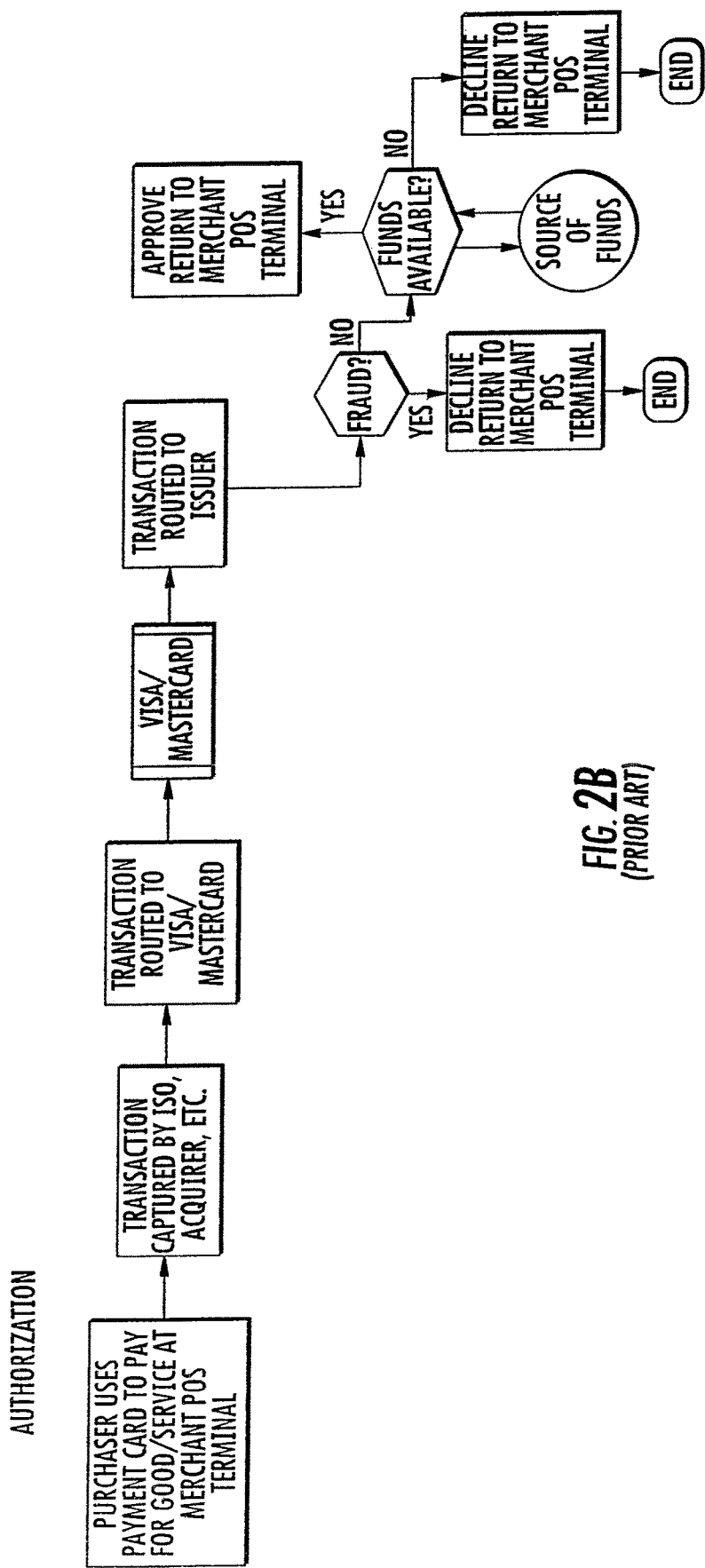
FIG. 2B is a flow diagram of the current industry process for authorization of a VISA/MasterCard transaction using a traditional payment card and computer network payment system.
Figure 2C:
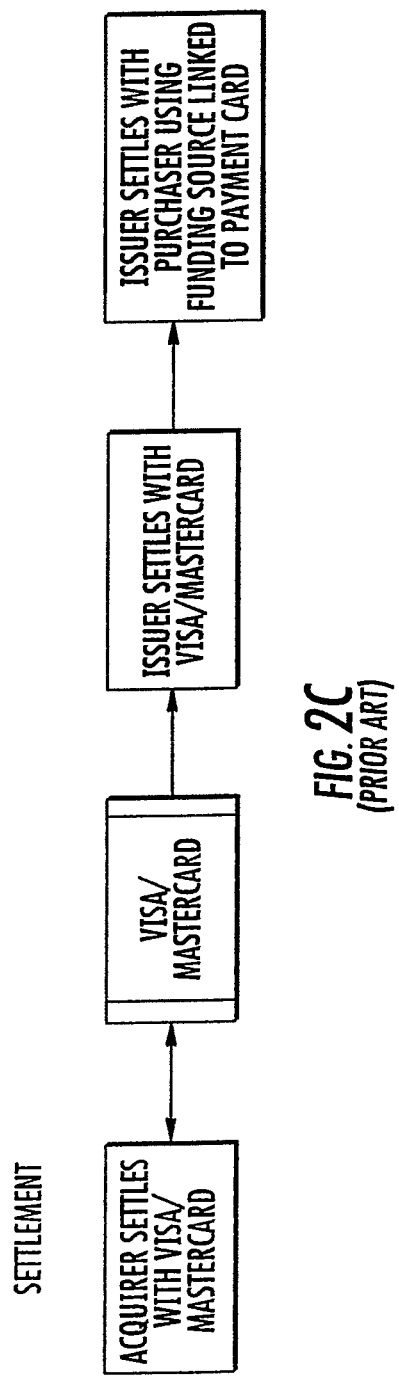
FIG. 2C is a flow diagram of the current industry process for settlement of a VISA/MasterCard transaction.

The following detailed description of the embodiment(s) is merely exemplary in nature and is in no way intended to limit the invention, its application, or uses.

The present invention relates to a payment vehicle having an "on" and "off" function. The "on" and "off" feature of the payment vehicle of the present invention permits the holder of a payment vehicle to provide instructions as to whether to turn its payment vehicle "on" when it is ready to be used and to be turned "off" to prevent use when the holder of the payment vehicle so chooses. The use to be prevented may either be of the payment vehicle holder itself or to prevent unauthorized use by another.

The present invention provides a way in which a holder of a payment vehicle, preferably a customer of the card issuer, can exert leverage or control over its payment vehicle.

A payment vehicle, as referred to herein, refers to an instrument used to conduct a payment transaction excluding cash. Examples of payment vehicles suitable for use in the present invention include, but are not limited to, a debit card, credit card, pre-paid card, stored value card, automated teller machine (ATM), wire, automated clearinghouse (ACH), online banking, online bill pay, and internet payment account. The payment vehicle of the present invention may be extended to other online payment services or instruments.

For example, a payment vehicle holder can use a device such as a personal data assistant (PDA) or a cell phone to send a text message that reads "card on" or to send a text message that reads "card off" to the bank or other institution that issued the payment vehicle to the cardholder.

The payment vehicle holder can keep the payment vehicle "off" and then send a text message to the payment vehicle issuer to turn it "on" for any number of reasons or at any time the holder of the payment vehicle so chooses. Likewise, a text message can be sent to turn it back "off" when done. There are any number of methods that are able to be used to notify to turn the payment vehicle "on" and "off" within the scope of the present invention. A text message is just one non-limiting example. The payment vehicle holder can establish or set rules with the card issuer as to when the card is to be turned "on" or "off." The holder of the payment vehicle can check card status at any time. The payment vehicle can be set to have time-based access. For example, rules may be set by time period such as the payment vehicle holder instructs to turn the payment vehicle off from 11 pm to 8 am daily. Another example is that the payment vehicle can be turned on or off based upon a specified transaction type such as by a merchant category code. Still yet another example is that the payment vehicle holder could determine that the payment vehicle only is "on" for gas and grocery purchases but "off" for internet purchases, international purchases, among others. Any number of rules could be set alone or in combination. Another example is that the payment vehicle can be turned on or off based upon country code.

In addition, the present invention relates to a payment vehicle having the "on" and "off" feature such as where the payment vehicle is an online banking account having established rules for when access is turned on and off. For example, the holder of the online banking account could set a rule that there can be no payments made using the online banking account, for example, between 11 pm and 8 am daily. Alternatively, the online banking account can be set such that fund status can be viewed but funds cannot be moved or transferred.

The "on" and "off" feature could be utilized in an authorization environment or in an environment where authorizations are not utilized. An important aspect to the present invention is the "on" and "off" functionality and the ability to give a payment vehicle holder who is typically a customer of a financial institution control of the payment vehicle in a computer-based network system leveraging that functionality.

The logic which is the basis for the "on" and "off" functionality in the computer-based network system is comprised within the payment vehicle's processing environment. The following non-limiting example relates to the processing of credit cards and debit cards although the logic is readily applied to other types of payment vehicles.

As mentioned previously, a typical credit card transaction involves a two-part transaction, namely authorization and settlement. During authorization, the question is asked if the money or funds are there and the question is asked if the card is valid. It can be a signature-based transaction or a PIN-based transaction. A pin-based transaction is a transaction in which authorization and settlement occur at same time. The method of authorization is card specific and is known in the industry. For example, VISA has a different payment network than other card providers. With the payment vehicle having the "on" and "off" feature of the present invention, the merchant would know that an invalid card is turned "off" for purposes of the transaction.

Settlement processing occurs with purchases made by internet, mail order, phone order, or card on file. Some of these go through an authorization transaction coming in looking for settlement from a merchant. A payment vehicle having the "on" and "off" feature of the present invention could be used in these transactions as well as other transactions that may involve interlink, automated teller machine (ATM), ACH, wires and others.

Figure 3:
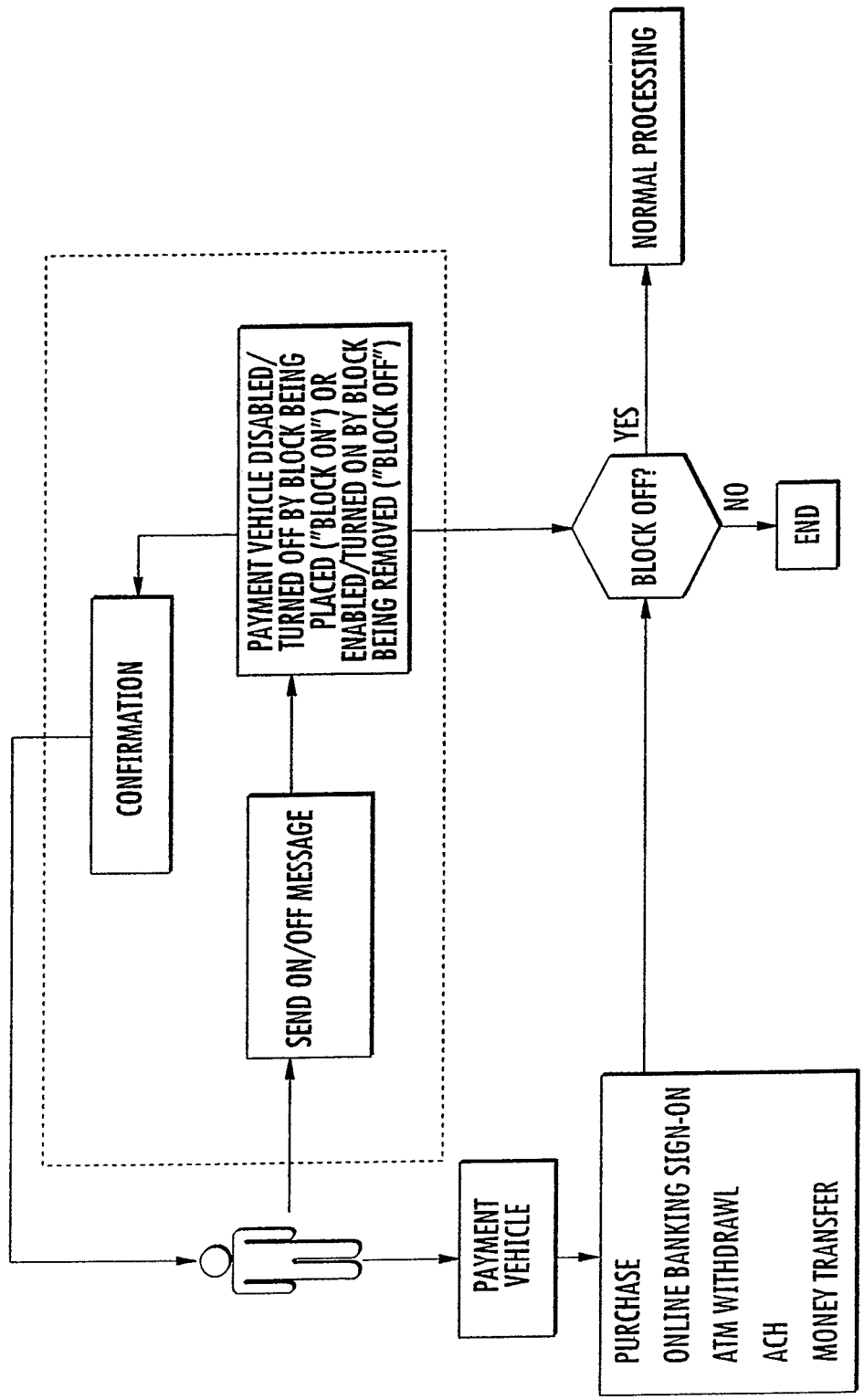
FIG. 3 is a flow diagram of the overall system and method of the present invention.

Referring now to the figures, FIG. 3 is a flow diagram illustrating the overall system and method of the present invention. As shown in FIG. 3, a payment vehicle holder sends an "on" or "off" message regarding its payment vehicle. After receipt of the message, the payment vehicle is either disabled (i.e. turned off) by a block being placed or enabled (i.e. turned on) by a block being removed. A confirmation of whether the block is on or off is electronically sent to the payment vehicle holder. The payment vehicle holder uses its payment vehicle to for example, make a purchase, signon to online banking, make an ATM withdraw!, make an ACH deposit, or money transfer. It is checked to see if the block is off for the payment vehicle. If the block is not off, the transaction ends. If the block is off, the transaction proceeds through normal processing for that respective payment vehicle.

Figure 4A:
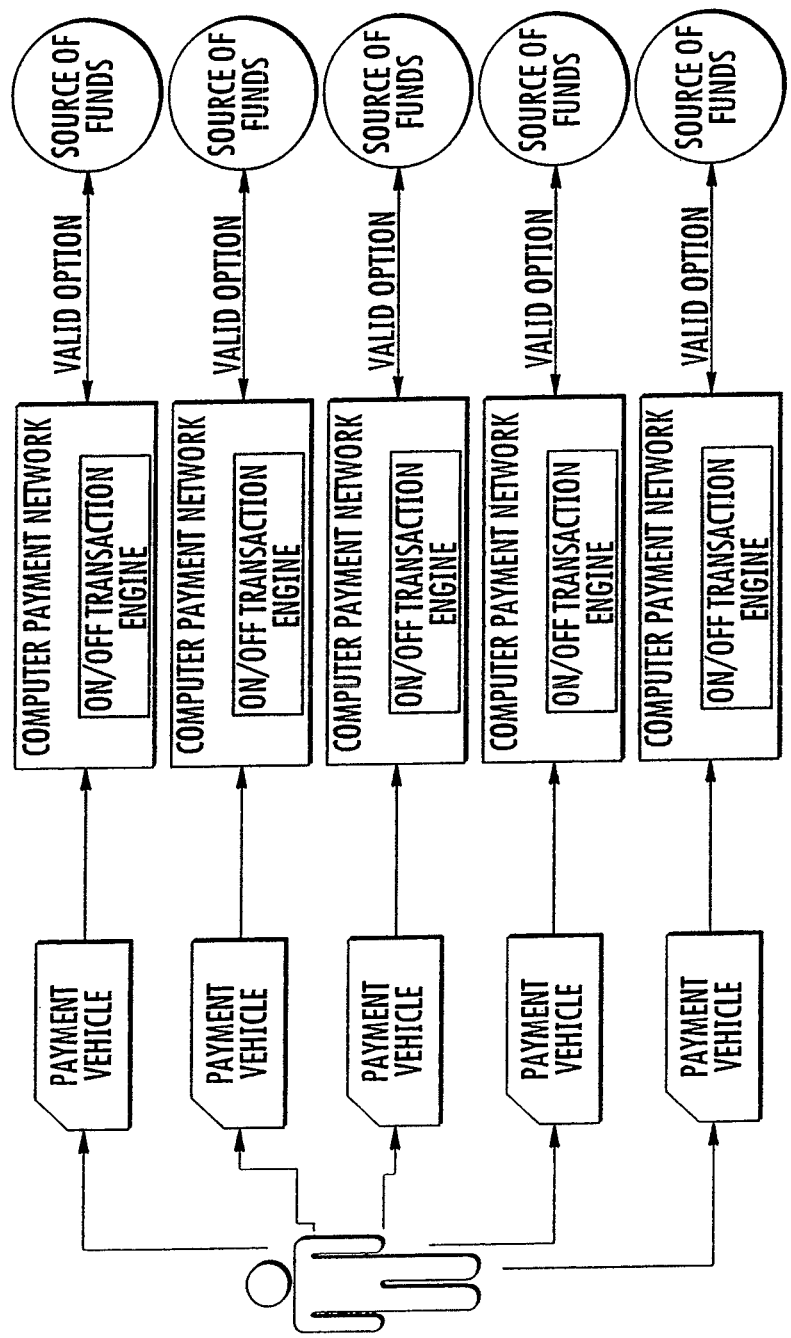
FIG. 4A is a flow diagram of the authorization process for a payment transaction using a payment vehicle having the on and off feature of the present invention.

FIG. 4A illustrates a payment vehicle having an "on" and "off" feature in accordance with the present invention for use in a computer-based environment for processing electronic payment transactions. As shown in FIG. 4A, the system comprises a user, a payment vehicle, a computer payment network comprising an "on" and "off" transaction engine, and a source of funds. Preferably, the user is the holder of the payment vehicle; however, it is within the scope of the present invention that someone other than the payment vehicle holder would use the payment vehicle to make a purchase or to access funds. The "on" and "off" transaction engine further comprises the "on" and "off" logic to determine whether or not the payment vehicle is enabled or disabled (i.e. "on" or "off") prior to a payment transaction. If the payment vehicle is "on" and a transaction is enabled (i.e. not disabled or blocked), it is a valid option and the computer payment network is connected to the source of funds. Each user potentially has access to multiple payment vehicles having this "on" and "off" functionality.

Figure 4B:
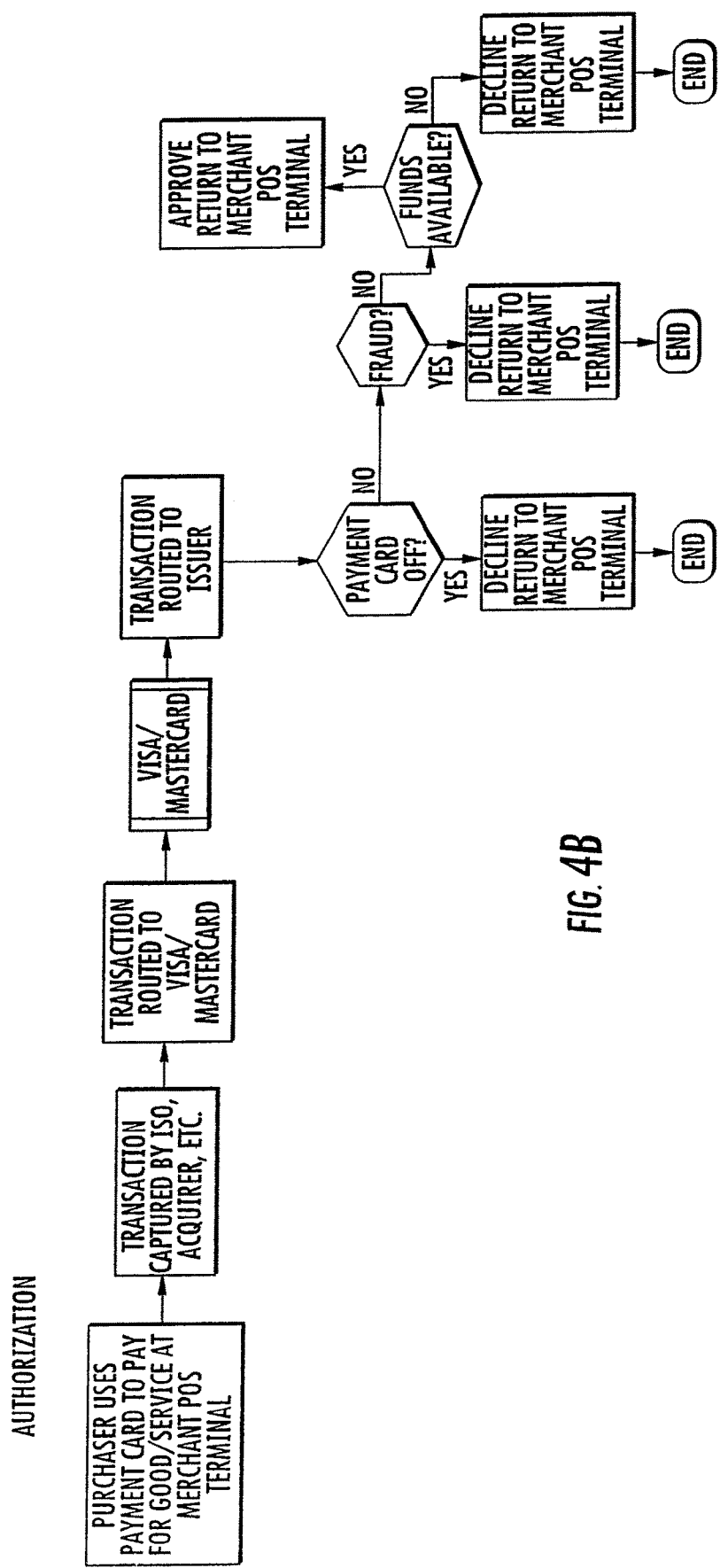
FIG. 4B is a flow diagram illustrating the overall environment in which the computer-based payment system and payment vehicle of the present invention operates.

FIG. 4B is a flow diagram of the authorization process for a payment transaction using a payment vehicle having the "on" and "off" feature of the present invention. As shown in FIG. 4B, a purchaser uses a payment card to pay for goods and services at a merchant point of sale terminal. The transaction is captured by the ISO or merchant acquirer. The transaction is routed to VISA/Mastercard. From VISA/Mastercard, the transaction is routed to the issuer. The "on" and "off" transaction engine of the computer payment network queries whether the payment card is "off." If it is "off," the transaction is declined and returned to merchant point of sale terminal. If the payment card is not "off," it is further processed to determine if there is fraud associated with the transaction. If there is fraud, the transaction is declined and returned to merchant point of sale terminal. If there is no fraud, the computer payment network checks to see if funds are available.

Figure 4C:
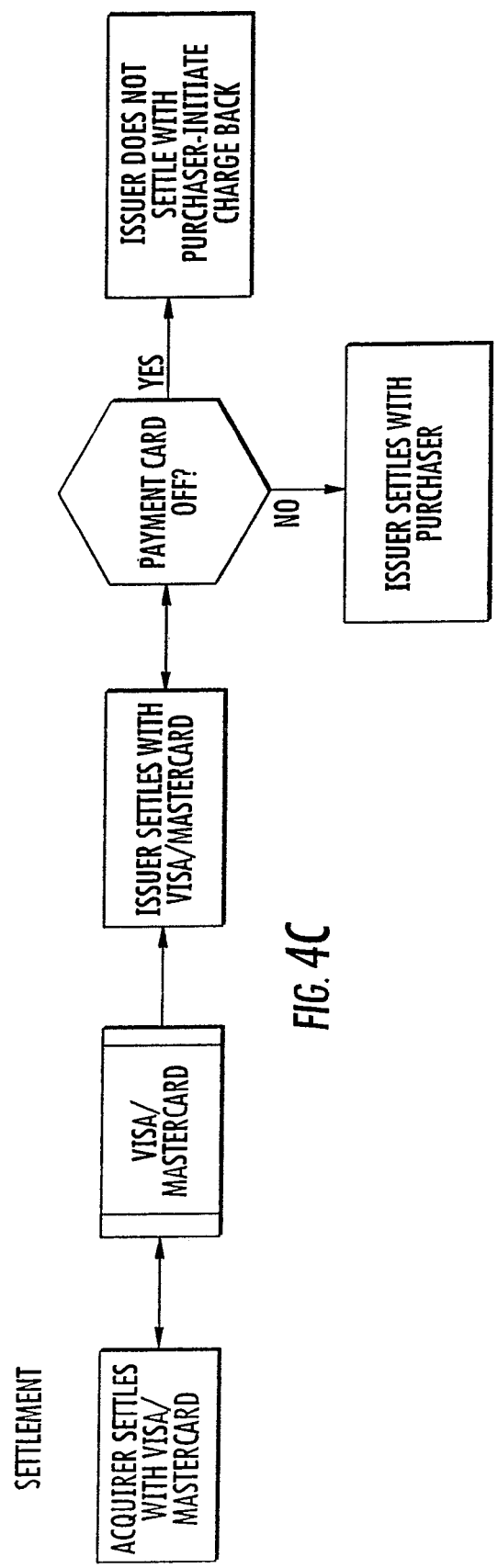
FIG. 4C is a flow diagram illustrating the settlement process for a payment transaction using a payment vehicle having the on and off feature of the present invention.

FIG. 4C is a flow diagram illustrating the settlement process for a payment transaction using a payment vehicle having the "on" and "off" feature of the present invention. As shown in FIG. 4C, the merchant acquirer settles with VISA/Mastercard. From VISA/Mastercard, the issuer settles with VISA/Mastercard. The "on"/"off" transaction engine queries whether the payment card is "off." If the payment card is not "off," the issuer settles with the purchaser. If the payment card is "off," the issuer does not settle with the purchaser and initiates charge back to the card. If funds are available, the transaction is approved and returned to merchant point of sale terminal. If funds are not available, the transaction is declined and returned to merchant point of sale terminal.

As discussed herein, a payment vehicle having the "on" and "off" feature of the present invention allows the holder of the payment vehicle to remotely enable or disable its payment vehicle. The present invention provides a payment vehicle holder such as a customer of a financial institution control over its payment vehicle through leveraging of the "on" and "off" logic that may be transmitted, for example, via text message, e-mail, or other electronic means. While the present invention may be run in a variety of settings, it is advantageous for its logic to be run in a card processing environment.

There are numerous other features that are optionally associated with a payment vehicle having the "on" and "off" feature of the present invention. For example, a payment vehicle holder such as a customer of a financial institution is able to get the latest status of his or her payment vehicle. For example, the status may be enabled or disabled as well as more detailed reporting. This core functionality leads to additional features as described below.

Among the features of the present invention include time based access to the payment vehicles. For example, the payment vehicle is enabled from x time toy time. This may also be used for online banking access also.

A two credit/debit level authorization per transaction 1 s another feature. For example, a customer will receive a communication, including but not limited to, a short message service (sms), a phone recording, or email verifying that it is permissible to allow the transaction.

Another feature of the payment vehicle of the present invention provides for the holder of the payment vehicle to refuse or stop a transaction that exceeds a predefined amount. The user may also refuse or stop a transaction of a specific type or limit the use of the payment vehicle to transactions of a certain type or merchant category code.

Yet another feature of the payment vehicle of the present invention is confirmation messaging. The payment vehicle holder receives a communication, including but not limited to, a sms, a phone recording, or email verifying that the payment vehicle holder's request to turn the payment vehicle on or off has been accomplished.

Still yet another feature of the payment vehicle of the present invention is vendor messaging. For example, when a person attempts to use a payment vehicle that has been turned off, the vendor receives a message informing him or her that the card is rejected as it is turned off.

It is within the scope of the present invention that this "on" and "off" feature associated with a payment vehicle is applicable to both existing and new customers, for example, of an institution such as a financial institution that is a card issuer. A customer enrolls for such a program and his/her account is marked accordingly. A customer selects a card account and agrees to use a card having the "on" and "off" feature. A customer then receives notification of enrollment, instructions, and initial card status. Such functionality is comprised, for example, in a card on/off transaction engine.

Thus, the payment vehicle of the present invention is advantageous for many reasons including because it provides additional security for payment vehicles. The payment vehicle of the present invention having the "on" and "off" feature permits customers to easily manage the security of their payment vehicles by switching them off when not in use. With the present invention, it is possible to disable the payment vehicle, such as a credit card, for safety or other purposes whenever the holder of a payment vehicle so chooses. For example, messaging is accomplished by sms or email.

Another advantage of the payment vehicle and method of the present invention is that it enhances loyalty through appreciation for the additional security, flexibility, and control that it provides consumers over their payment vehicles.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A financial institution computing system associated with a financial institution comprising a transaction engine configured to cause the financial institution computing system to:
   receive, from a user device associated with a user, a message including a rule that the user wishes to be associated with a payment vehicle of the user, the rule including criteria against which future transaction authorization requests are to be assessed;
   in response to receiving the message, update logic associated with the payment vehicle stored at the financial institution computing system to incorporate the rule, wherein the logic associated with the payment vehicle includes a user-preferred activation status of the payment vehicle, wherein the user-preferred activation status of the payment vehicle may be updated by the user;
   receive, from a merchant computing system associated with a merchant, a first transaction authorization request;
   determine that the first transaction authorization request is inconsistent with the rule; and
   in response to the determination that the first transaction authorization request is inconsistent with the rule:
      provide a first indication that the first transaction authorization request is inconsistent with the rule to the merchant, wherein the first indication contains information concerning the rule; and
      provide a second indication that the first transaction authorization request is inconsistent with the rule to the user device.

2. The financial institution computing system of claim 1, wherein the message comprises an e-mail.

3. The financial institution computing system of claim 1, wherein the message comprises a text message.

4. The financial institution computing system of claim 1, wherein the transaction engine is further configured to cause the financial institution computing system to:
   receive, from the user device, a request for information regarding the logic associated with the payment vehicle; and
   in response to receiving the request, provide information regarding the logic associated with the payment vehicle to the user device.

5. The financial institution computing system of claim 1, wherein the rule associated with the payment vehicle places the payment vehicle into an inactivated state.

6. The financial institution computing system of claim 1, wherein the rule associated with the payment vehicle inactivates the payment vehicle for transactions above an amount.

7. The financial institution computing system of claim 1, wherein the rule associated with the payment vehicle inactivates the payment vehicle for transactions at a set of merchants.

8. The financial institution computing system of claim 1, wherein the rule associated with the payment vehicle inactivates the payment vehicle for transactions occurring within a specified time interval.

9. The financial institution computing system of claim 1, wherein the transaction engine is further configured to cause the financial institution computing system to, in response to updating the logic associated with the payment vehicle, provide the user with confirmation of updating the logic.

10. The financial institution computing system of claim 1, wherein the transaction engine is further configured to cause the financial institution computing system to:
receive a second transaction authorization request;
determine that the second transaction authorization request is consistent with the rule; and
in response to the determination that the second authorization request is consistent with the rule, provide an indication that the second transaction authorization request is consistent with the rule to the user device prior to authorizing the transaction.

11. A computer-implemented method, comprising:
receiving, by a financial institution computing system, from a user device associated with a user, a message including a rule that the user wishes to be associated with a payment vehicle of the user, the rule including criteria against which future transaction authorization requests are to be assessed;
in response to receiving the message, updating, by the financial institution computing system, logic associated with the payment vehicle stored at the financial institution computing system to incorporate the rule, wherein the logic associated with the payment vehicle includes a user-preferred activation status of the payment vehicle, wherein the user-preferred activation status of the payment vehicle may be updated by the user;
receiving, by the financial institution computing system, from a merchant computing system associated with a merchant, a first transaction authorization request;
determining, by the financial institution computing system, that the first transaction authorization request is inconsistent with the rule; and
in response to the determination that the first transaction authorization request is inconsistent with the rule:
providing, by the financial institution computing system, a first indication of that the first transaction authorization request is inconsistent with the rule to the merchant, wherein the first indication contains information concerning the rule; and
providing, by the financial institution computing system, a second indication that the first transaction authorization request is inconsistent with the rule to the user device.

12. The computer-implemented method of claim 11, wherein the message comprises an e-mail.

13. The computer-implemented method of claim 11, wherein the message comprises a text message.

14. The computer-implemented method of claim 11, further comprising:
receiving, by the financial institution computing system, from the user device, a request for information regarding the logic associated with the payment vehicle; and
in response to receiving the request, providing, by the financial institution computing system, information regarding the logic associated with the payment vehicle regarding the user device.

15. The computer-implemented method of claim 11, wherein the rule associated with the payment vehicle places the payment vehicle into an inactivated state.

16. The computer-implemented method of claim 11, wherein the rule associated with the payment vehicle inactivates the payment vehicle for transactions above an amount.

17. The computer-implemented method of claim 11, wherein the rule associated with the payment vehicle inactivates the payment vehicle for transactions at a set of merchants.

18. The computer-implemented method of claim 11, wherein the rule associated with the payment vehicle inactivates the payment vehicle for transactions occurring within a specified time interval.

19. The computer-implemented method of claim 11, further comprising, in response to updating the logic associated with the payment vehicle, providing, by the financial institution computing system, the user with confirmation of updating the logic.

20. The computer-implemented method of claim 11, further comprising:
receiving, by the financial institution computing system, a second transaction authorization request;
determining, by the financial institution computing system, that the second transaction authorization request is consistent with the rule; and
in response to the determination that the second authorization request is consistent with the rule, providing, by the financial institution computing system, an indication that the second transaction authorization request is consistent with the rule to the user device prior to authorizing the transaction.

* * * * *